United States Patent [19]
Healey

[11] Patent Number: 5,165,080
[45] Date of Patent: Nov. 17, 1992

[54] OPTICAL DISTRIBUTOR

[75] Inventor: Peter Healey, Ipswich, England

[73] Assignee: British Telecommunications public limited company, London, England

[21] Appl. No.: 654,000

[22] Filed: Feb. 13, 1991

Related U.S. Application Data

[63] Continuation of Ser. No. 358,358, filed as PCT/GB88/00746, Sep. 9, 1988, abandoned.

[30] Foreign Application Priority Data

Sep. 11, 1987 [GB] United Kingdom ............... 8721472

[51] Int. Cl.$^5$ .............................. G02B 27/14
[52] U.S. Cl. .................................. 359/636
[58] Field of Search .......... 350/171, 173, 169; 359/636

[56] References Cited

U.S. PATENT DOCUMENTS 2,267,948 12/1941 Rantsch .............................. 350/173
3,501,640 3/1970 Harris .

FOREIGN PATENT DOCUMENTS 2454996 5/1976 Fed. Rep. of Germany .
2341873 10/1976 France .
2187861A 9/1987 United Kingdom .

OTHER PUBLICATIONS

Japanese Patent Abstracts, vol. 7, No. 73 Mar. 25, 1983.
Journal of Lightwave Technology, Vo LT-3, No. 2, Apr. 1985 4×4 Optical Gate Matrix Switch, Himeno et al.

Primary Examiner—Jon W. Henry
Attorney, Agent, or Firm—Nixon & Vanderhye

[57] ABSTRACT

An optical distributor comprises an optical input (I1), and $2^n$ optical outputs (01-08), where n is an integer greater than 1, one or more plane mirror surfaces (8) and transflective means (2, 4, 6). The plane mirror surface or surfaces (8) and the transflective means (2, 4, 6) are arranged to provide one optical path between the input (I1) and each of the outputs (01-08), each path making n transitions only at the transflective means. In a preferred embodiment the transflective means comprise n separate beam splitter stages, the effective lengths of the n separate splitter stages (2, 4, 6) being substantially in the ratio 1.2 $2^n$. The beam splitters may be formed by transflective coatings on glass substrates.

17 Claims, 9 Drawing Sheets

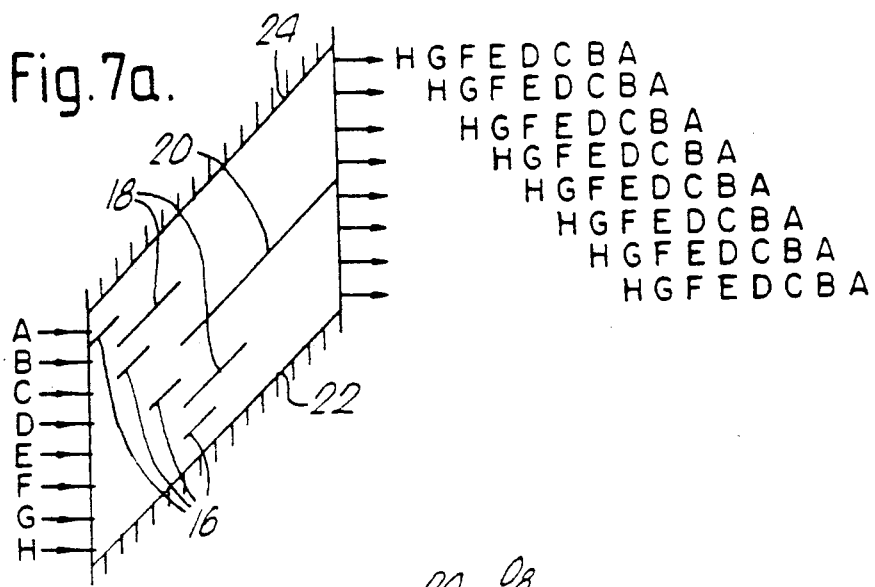
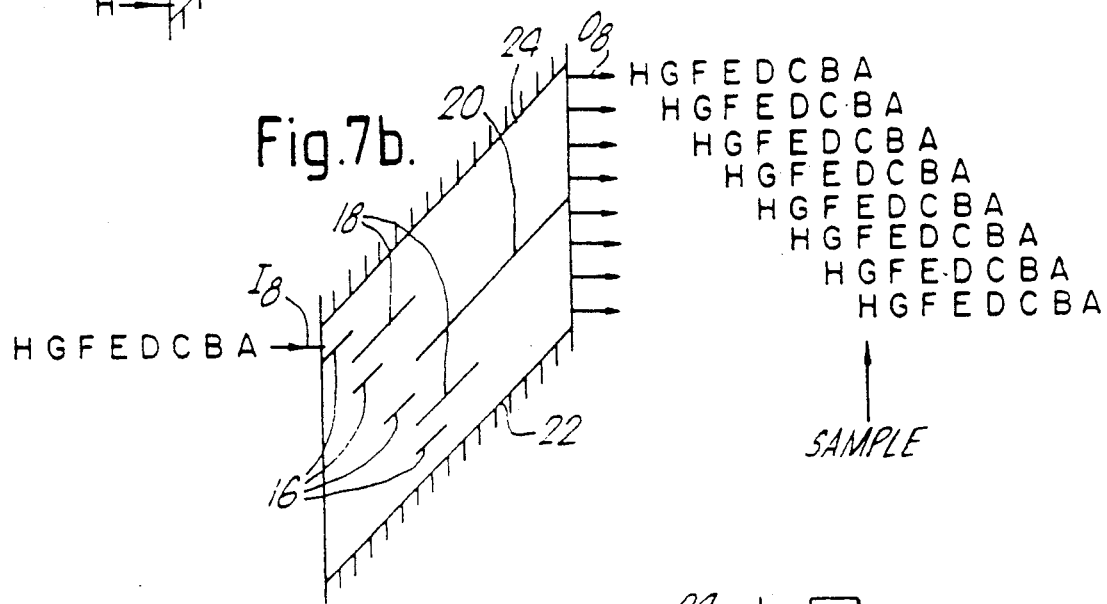
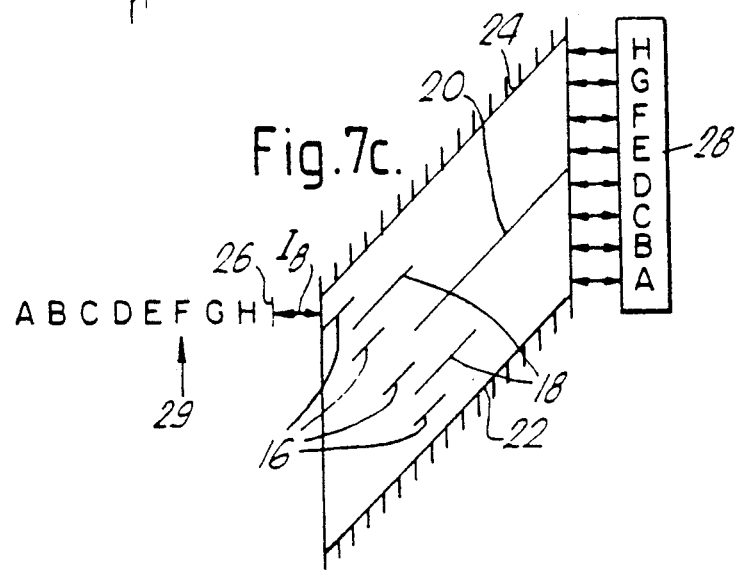

5,165,080

OPTICAL DISTRIBUTOR

This is a continuation of application Ser. No. 07/358,358, filed as PCT/GB88/00746, Sep. 9, 1988, now abandoned.

BACKGROUND AND SUMMARY OF THE INVENTION

The present invention relates to devices for distributing optical signals. Such devices are needed in fields such as optical communications and signal processing. They may be required to split only one input signal amongst $2^n$ output devices or alternatively may interconnect $2^n$ input devices with $2^n$ output devices, n being an integer greater than 1. Known devices used for this purpose have typically been formed from arrays of 4-port optical couplers interconnected by links of optical fibres in a star network configuration. These devices require large numbers of separate components, as many as 12 different couplers being required in the case of an 8 port star network. The physical complexity of such systems makes them expensive to manufature and difficult to install in-line in optical systems. Moreover, insertion losses associated with each individual coupler have a cumulative effect which significantly degraded the performance of the network as a whole.

FR-A-2,341,873 and DE-A-2454,996 disclose a method of forming a 1 to $2^n$ optical distributor which uses n successive stages of optical beam splitters, each beam splitter stage having one or more individual transflective beam splitters to split an optical path into two further paths, and mirrors to realign the optical paths as necessary.

Such devices are capable of splitting an optical signal equally among many outputs and of distributing intact all the components of a signal which is multidimensional in the optical regime, having spatial, colour, time and polarisation components but it uses an arrangement which requires $2^{(k-1)}$ separate beam splitters components for the $k^{th}$ stage and associated mirrors which means the number of beam splitters elements increases rapidly with increasing n.

According to a first aspect the present invention an optical distributor has at least one optical input, $2^n$ optical outputs, where n is an integer greater than 1, one or more plane mirror surfaces and at least one transflective means, the plane mirror surface or surfaces and the transflective means being arranged to provide one optical path between the input and each of the outputs, each path making n transitions only at the transflective means, at least two of the transflective means being portions of a single transflective surface.

A device in accordance with the present invention is more compact, and may be formed using a smaller and sometimes the minimum number of different components than with previously known arrangements and can therefore be simpler and cheaper to manufacture and install. The two transflective means may be part of the same or different beam splitter stages.

The present invention is applicable to distributors having a single input to provide a 1 to $2^n$ distributor, which is functionally equivalent to known such distributors as previously described, as well as to distributors where the above optical input is one of $2^n$ optical inputs, for example star couplers.

The transflective means may, for example, be formed by a transflective coating on a glass substrate or by a cube beam splitter. They have the property that light incident upon the transflective means is divided into two beams of equal power, a reflected beam and a transmitted beam. The transflective means are substantially insensitive to the presence of different polarisation components in the incident light.

The or each plane mirror surface may be formed by a conventional metal or multilayer dielectric coating on a glass substrate, by a totally reflecting prism or by any other surface arranged to reflect substantially all of the power of any incident beam.

A distributor according to the present invention having one input and $2^n$ outputs can be arranged to n beam splitter stages each of which includes a single separate transflective surface and a first plane mirror surface arranged such that the or each beam incident on each beam splitter stage is split into a reflected beam and a transmitted beam, one of the beams passing directly to any subsequent beam splitter stage, the other of the two beams being reflected at the first plane mirror surface before passing to any subsequent beam splitter stage.

Preferably the transflective surfaces are arranged to lie at substantially 45° to the incident beams and the plane mirror surface is parallel to the transflective surfaces.

This arrangement provides a 1 to $2^n$ optical distributor using one mirror and only n beam splitter elements.

Preferably the splitter stages are arranged in order of beam splitter effective length, with the shortest stage closest to the optical input. In such a device the effective length of the beam splitter is determined by the physical length of the transflective surface.

According to a second aspect of the present invention there is provided an optical distributor having $2^n$ optical inputs according to the first aspect of the invention, each of the transflective means being in the optical paths originating from at least two distinct inputs.

A first arrangement of such an optical distributer may comprise n beam splitter stages in which each kth beam splitter stage has $2^{n-k}$ spatially separate transflective surfaces arranged between a first plane mirror surface and a second opposing plane mirror surface parallel to the first plane mirror surface.

In this case each of the $2^{(n-k)}$ transflective surfaces of the kth beam splitter stage form $2^k$ of transflective means of that beam splitter stage. The stages are not necessarily in order as will be discussed later.

In another arrangements the transflective means from different stages can be formed from a single transflective element.

In such arrangements the transflective surfaces of the beam splitter stages each act as beam splitters for beam originating from two or more inputs.

A further redundancy in transflective means can be obtained in a reflective star coupler according to the present invention as each transflective means can form the transflective means necessary for the optical path of at least four inputs.

Alternatively the transflective means of all the necessary beam splitter stages can comprise portions of a single transflective surface in which case the plane mirror surfaces include separate mirror surfaces of different lengths arranged on either side of the single transflective surface.

Preferably the beam splitters extend in the direction at right angles to a first plane containing the optical input and outputs and one or more further independent sets of optical inputs and outputs are provided in a plane or planes parallel to the first plane.

A distributor in accordance with present invention has the properties of a star-network in the case with $2^n$ inputs and $2^n$ outputs or a tree-network in the simpler case of a single input going to $2^n$ outputs. It is readily constructed because all the beam splitters may be identical in form, differing only in scale for the different stages. This enables the use of a minimum number of components to achieve the desired power distribution. Since there is only one path between each input and output port, multipath propagation and the resultant degradation in signal handling cannot occur. The ratio of the device endface size to its length is $2^n/(2^n-1)$ and tends to unity for large n. The power distributor is therefore well proportioned and compact, facilitating its insertion in line in optical systems.

BRIEF DESCRIPTION OF THE DRAWING FIGURES

A device in accordance with the present invention is now described in detail with reference to the accompanying drawings, in which:

FIG. 7a to 7c are diagrams illustrating the multiplexing functions of devices in accordance with the present invention;

DETAILED DESCRIPTION OF THE DRAWING FIGURES

Figure 1:
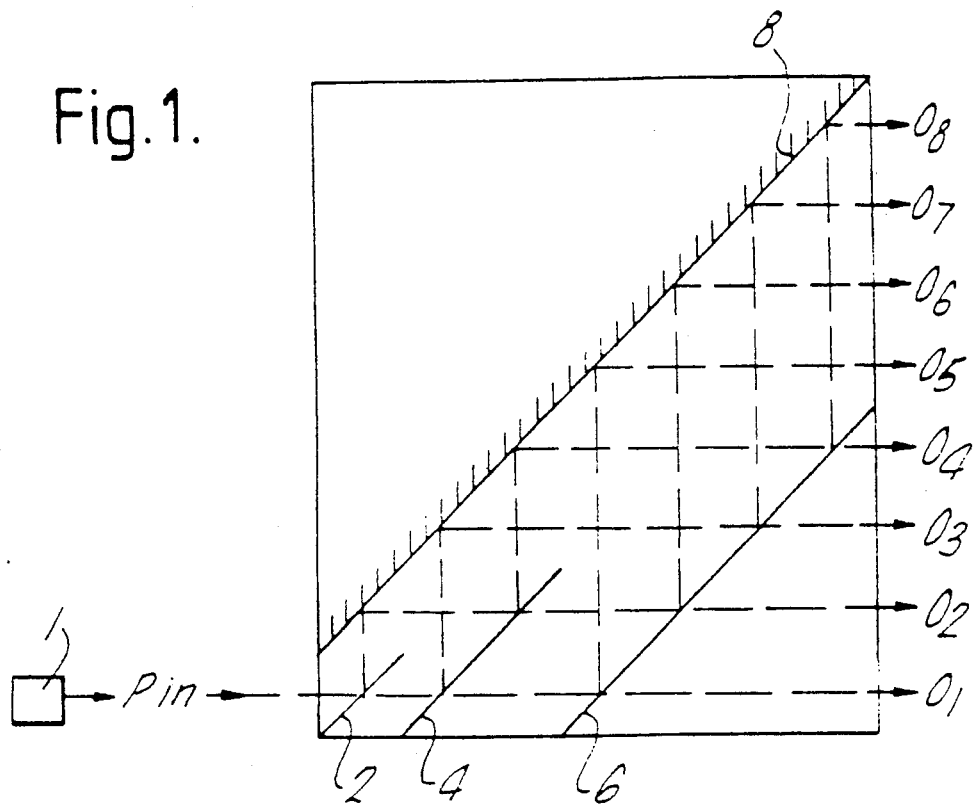
FIG. 1 is a side elevation of a first embodiment of the present invention having a single input.

Referring to FIG. 1 a device for distributing an optical signal among eight outputs comprises an optical input 1 and three splitter stages 2, 4, 6. Each splitter stage includes a transflective surface lying at 45° to the direction of incidence of light from the input 1. A mirror 6 extends across the device parallel to the transflective surfaces of the splitter stages 2, 4, 6. The transflective surface of the second splitter stage 4 is twice the length of the surface of the first splitter stage 2 and the surface of the final splitter stage 6 is in turn twice the length of the surface of the second splitter stage 4.

In use, a single beam is input at the optical input 1 which follows the optical paths shown by the dotted lines to the outputs 01 to 08. The beam strikes the first beam splitter 2 and is divided into two beams of equal power by a portion of the 50:50 transflective surface of the beam splitter (constituting a transflective means). One of the two resultant beams is transmitted through the beam splitter 2 and passes directly to the second beam splitter 4. The other beam is reflected from the transflective surface at 90° to the one beam and is reflected through a further 90° at the mirror sides so that after reflection the other beam propagates parallel to the one beam but separated from it in space. If losses at the mirror are neglected then since each beam has undergone a single transition at a 50:50 transflective surface each of the two beams reaching the second splitter stage 4 has half of the power of the original input beam. The beams are similarly subdivided at the subsequent splitter stages 4, 6 giving a total of eight beams at the optical outputs 01-08. Each of the paths from the input 1 to the outputs 01-08 involves three transitions at 50:50 transflective surfaces. The power of the input beam is therefore equally divided with one eight going to each of the outputs 01-08.

The transflective means of each stage form a single transflective element corresponding to that stage.

The device may conveniently be constructed as a "sandwich" of optical glass substrates. Transflective coatings are applied to the substrates using masks to give the required coating geometry. The coating used is chosen to have transmission and reflection coefficients which are equal for light of different polarisation states incident at 45° and for a wide range of wavelengths. The device is therefore polarisation and wavelength insensitive. The substrates are then aligned by the outer edges and bonded with optical epoxy resin. A mirror coating is then applied or a separate mirror attached. Finally the "sandwich" is cut and polished to give optical quality end faces.

Figure 2:
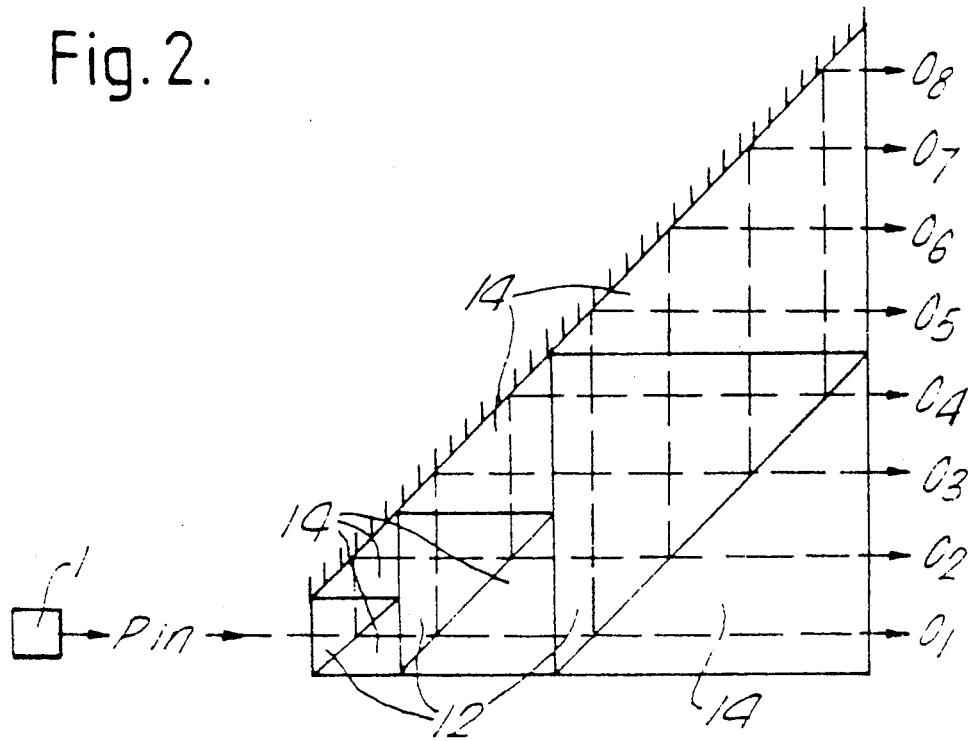
FIG. 2 is a side elevation of an alternative embodiment of the present invention having a single input.

An alternative construction shown in FIG. 2 uses an ensemble of beam splitter cubes 12 of graded sizes packed with 45° prisms 14. This construction requires more sub-assemblies but is physically suited to the fabrication of simple tree-networks with only one input. In place of beam splitter cubes polarising beam splitters followed by quarter wave plates may be used if the input and output states of polarisation of the light are known to be fixed.

In constructing the device the transflective coatings may be made colour selective to give a wavelength responsive routing function. In this case one or more of the beam splitting surfaces is arranged to function as a dichroic mirror. At a given wavelength substantially all of the light incident on the dichroic mirror is reflected whilst light of a significantly differing wavelength is transmitted. With a distributor including such wavelength selective surfaces a signal may be wavelength encoded to determine at which output or outputs it leaves the device.

The beam splitters may be made active to allow the interconnect pattern to be rearranged dynamically. The splitters may, for example, comprise polarising beam splitters and associated electro-optic polarisers such as liquid crystal cells arranged to function as half-wave plates. The input to the distributor is then linearly polarised in a given direction and the optical axes of the polarisers and beam splitters arranged at such an angle to the direction of polarisation of the light that an incident beam is transmitted or reflected according to the state of the electro-optic polariser. Alternatively, active ¼-wave plates maybe used to produce circularly polarised components from the incident plane polarised beam.

Figure 3:
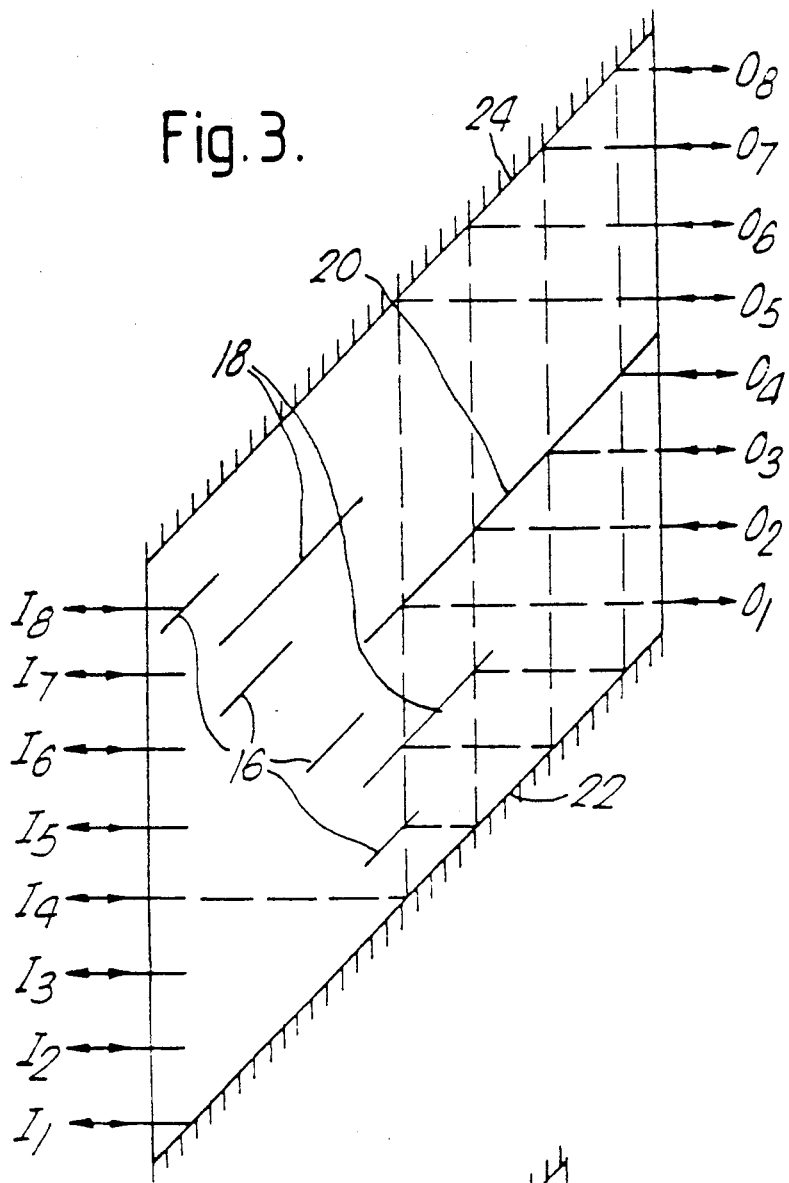
FIG. 3 is a side elevation of a further alternative embodiment of the present invention in the form of a star coupler.
Figure 4:
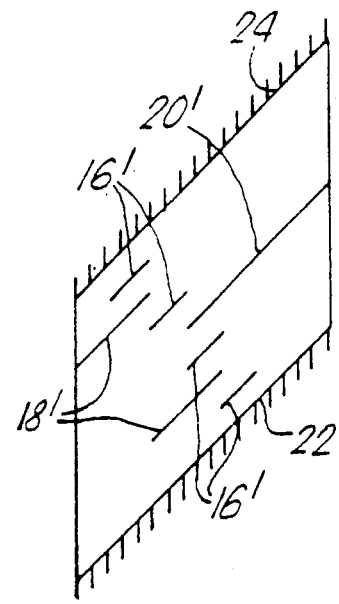
FIGS. 4 and 5 are side elevations of a star coupler functionally equivalent of FIG. 3 with the beams splitting stages in different orders.
Figure 5:
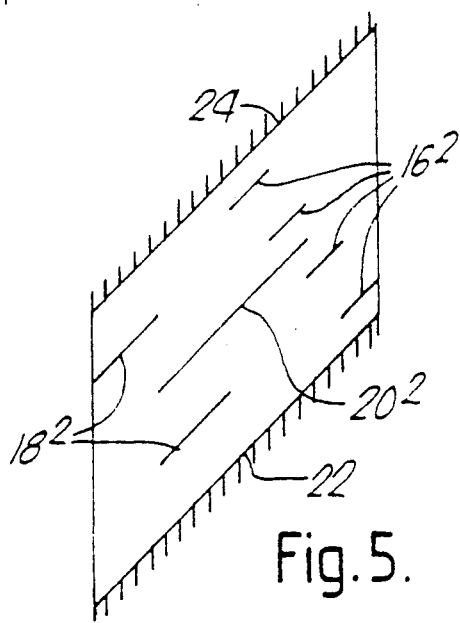

Referring now to FIG. 3, a device according to the present invention configured as a star network is arranged to connect eight optical inputs I1 to I8 with eight optical outputs O1 to O8. As before there are, by way of example only, three splitter stages. However in this example the first splitter stage includes four separate beam splitters 16 the second splitter stage two beam splitters 18 and the final splitter stage a single beam splitter 20. In general for a star network with $2^n$ outputs and $2^n$ inputs then if the ensemble of splitter stages are considered in order of increasing splitter lengths the kth splitter stage has with this specific arrangement $2^{n-k}$ separate beam splitters. It should be noted that the splitter stages do not need to be physically ordered in order of splitter length but may, for example, be arranged in configurations such as those of FIGS. 4 and 5.

In use each input of the star-network effectively sees a tree network which functions in the same manner as that described above according to the first aspect of the invention. For clarity paths from just one of the inputs is shown in FIG. 3. A light beam from input I4 strikes a lower mirror 22 at 45° and is reflected upwards to the uppermost of the beam splitters of the first stage 16. Here it is split in two by the 50:50 transflective surface, the reflected beam passing directly to the upper beam splitter of the second stage 18 and the transmitted beam being reflected at an upper mirror 24 before travelling parallel to the reflected beam to the same upper beam splitter of the second splitter stage 18. A beam can be traced in similar fashion each of the other input and can be seen to be split in a manner precisely analogous to that described above for the tree-network. As with the tree network each path between the inputs I1-I8 and the outputs O1-O8 undergoes the same number of transitions at 1:1 transflective means and so the power from any one of the inputs I1-I8 is divided equally between the eight outputs O1-O8. The star-network is bi-directional: light may be input from either end.

The tree networks for different inputs I1 to I8 have transreflective portions in common because the two parallel mirror 22 and 24 provide that optical paths from different inputs approach them from two orthogonal directions.

Figure 6:
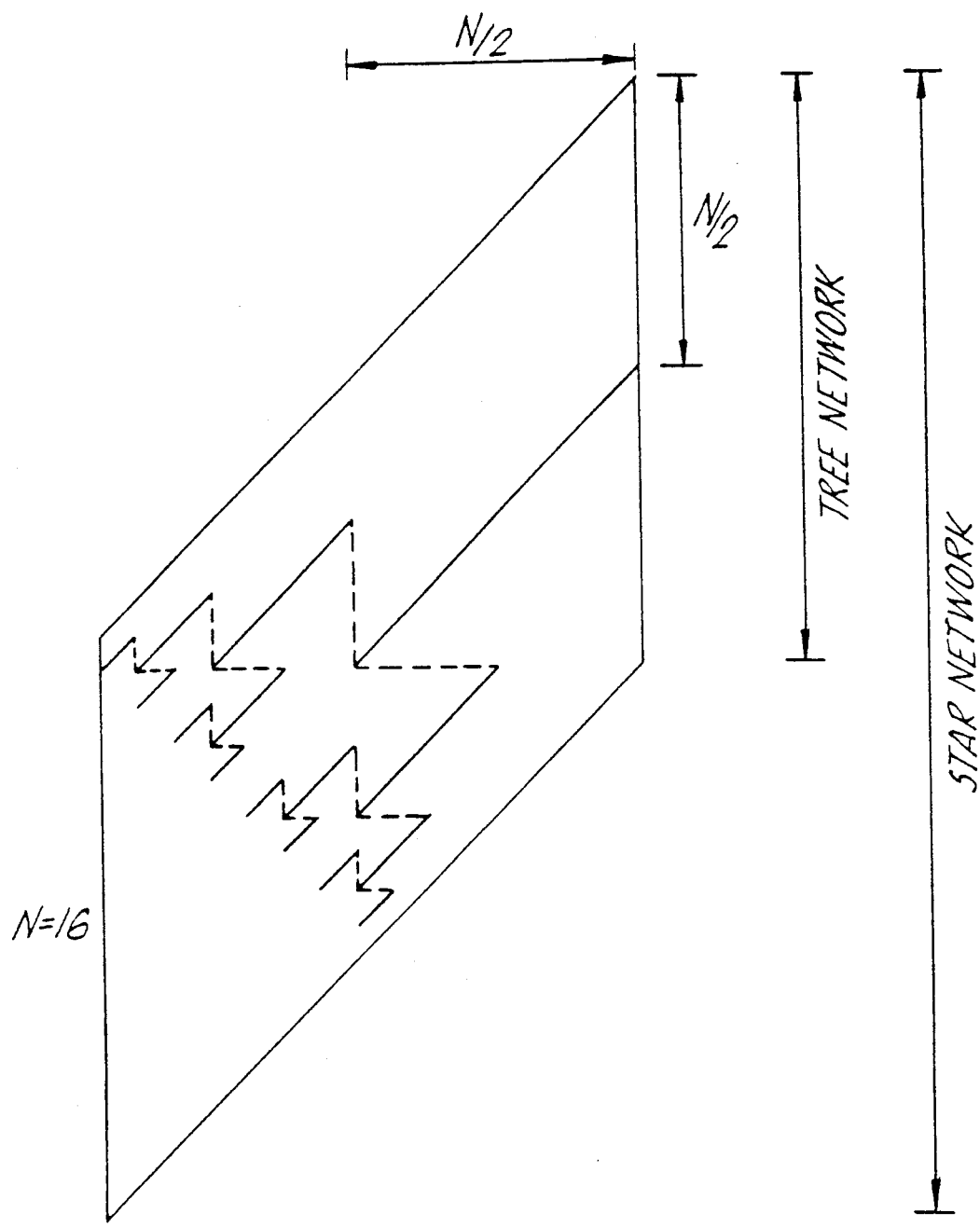
FIG. 6 is a diagram illustrating growth-rules for the beam splitter networks shown in FIGS. 1, 2 and 3.

By increasing the number of beam splitter stages a device in accordance with the present invention can be made for distributing power from one or many inputs independently between a selected number of $2^n$ outputs. Growth rules for both tree and multiple input star networks of the arrangements shown in FIGS. 1, 2 and 3 are shown in FIG. 6.

The propagation delay through the star network of FIG. 3 is a linear function of input position with light from input I8 following the shortest path and hence emerging first and light from input I1 following the longest path and hence emerging last. This property may be exploited to give spatially-parallel to time-serial or time-serial to spatially-parallel multiplexing operations. Consider the 8×8 star couplers shown in FIGS. 7a to 7c. In 7a a simultaneous but spatially split input to the device is output as a signal which is spatially identical i.e. the same from each of the spatially separated ports, but time-serial i.e. the output from the lowermost port precedes that from the port immediately above it and so on signal A being the first to exit from each. As shown in FIG. 7b the device may be used to carry out the inverse operation in an analogous manner by inputting at input I8 a time serial signal (in which A enters the distributor first) and simultaneously sampling the outputs as signal A exits output O8.

Either of the end faces of the device may be coated with a mirror surface to give a distributor with the properties of a reflective-star-network but with $2^n$ multiple paths. However since each multiple path has a propagation delay that is a linear function of position this feature enables the use of the device as a single-ended spatially-parallel to time-serial multiplexer as shown in FIG. 7c. A plane wave pulse 26 is fed into the input port $I_8$ which is distributed to the eight output ports. The output pulses impinge on a spatial modulator 28 serially, A which therefore feeds back into the distributor time-serial inputs A to H which then pass back to the input $I_8$ to exit as a time-serial signal 29.

Figure 8A:
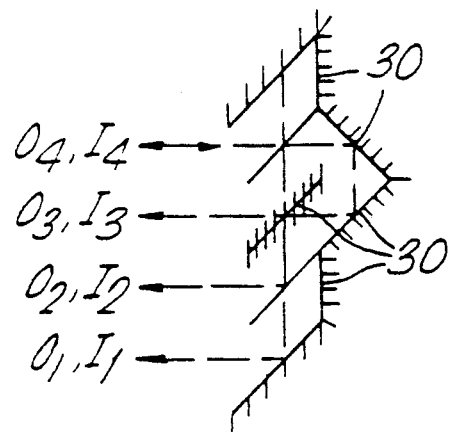
FIGS. 8a and 8b are side elevations of reflective networks in accordance with the present invention.
Figure 8B:
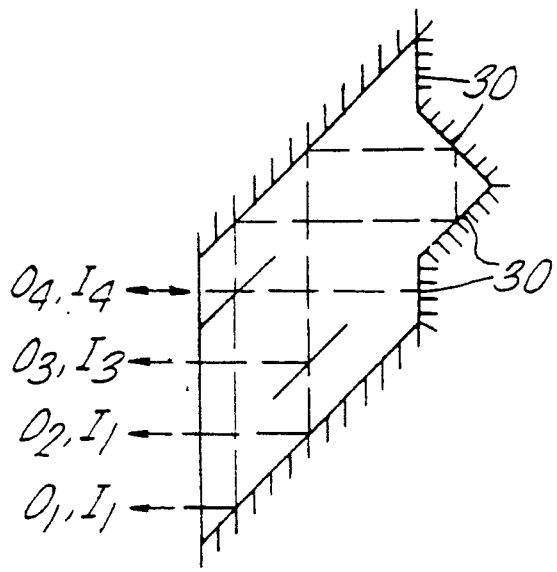

Referring now to FIGS. 8a and 8b there are shown reflective 4×4 star couplers and an illustrative beam path for an input at $I_4$ which have transflective elements 28, mirrors 20 and 22 corresponding to those of FIG. 2 and additional mirrors 30 which introduce additional redundancy in that the 4×4 coupler requires only two transflective means each on each one transflective element.

Figure 9:
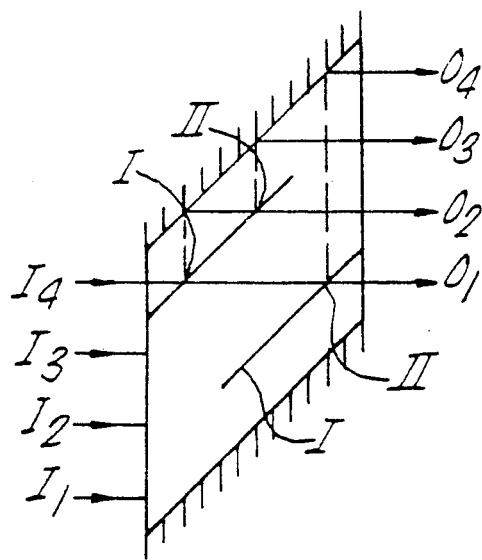
FIG. 9 is a side elevation of a four by four coupler according to the present invention in which transflective elements of different stages are formed on a common element.

In the embodiments described with reference to FIGS. 1 to 5 the transflective means which were formed by common transflective elements were from the same beam splitter stage. This need not be the case: in some configurations transflection means from different stages can be combined, according to the present invention, on one transflective surface to obtain a component reduction. This is shown in the 4×4 star coupler of FIG. 9 in which stage one and stage two means (I and II respectively) are combined on one element. This enables a 4×4 coupler to be constructed from only two transflective elements.

Figure 10:
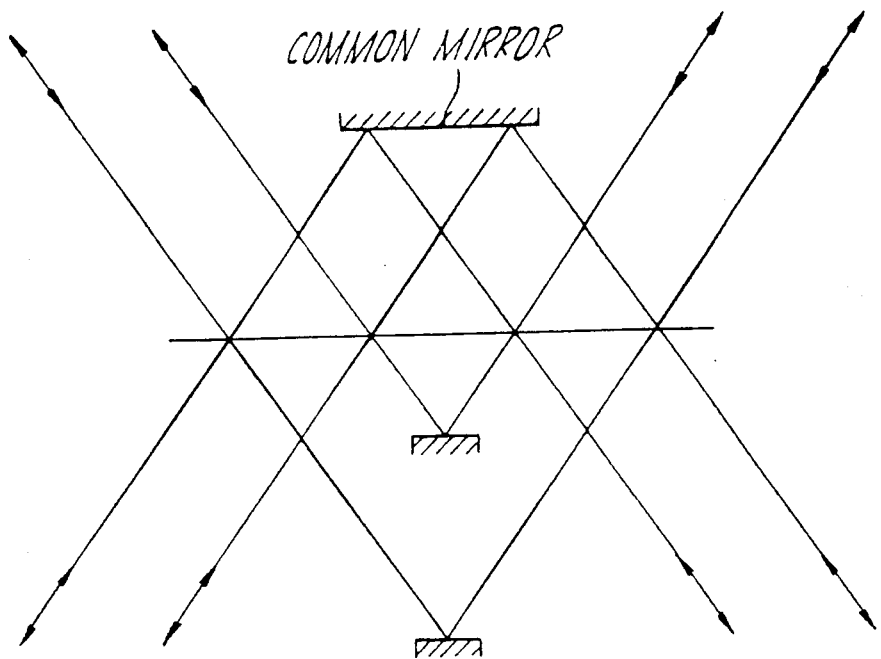
FIG. 10 is a diagram illustrating a 4 input common transflector network in accordance with the present invention.
Figure 11:
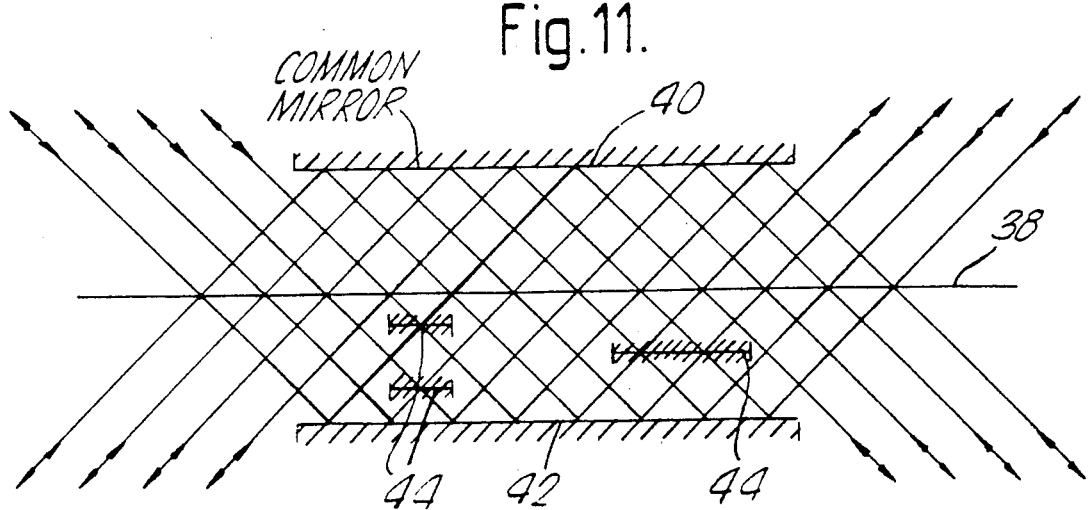
FIG. 11 is a diagram illustrating an 8 input common transflector network in accordance with the present invention.

In alternative embodiments of the present invention shown in FIGS. 10 and 11, a single transflective surface forms the transflective means for all the splitters stages. FIG. 10 is a 4×4 star coupler utilising this configuration. Another such configuration is shown in FIG. 11 is an 8×8 star coupler having a transflective element 38, two common mirrors 40, 42 and three double sided mirrors 44. In general for an N×N network where N equals $2^n$, (N/2+1) mirrors are required including two mirrors common to all stages. There are $(\log_2 N)-1$ stages, the first stage having (N/4+2) mirrors, including the mirror common to all stages. The second stage has (N/8+2) mirrors and so on, the jth stage having $(N/2^{(j+1)})+2$ mirrors. The internal mirrors, which are double sided, are arranged about a point spaced midway between the transflective surface and one of the common mirrors. The common mirrors are placed on opposite sides of the transflective surface and spaced from it by a distance proportional to N/4. The common mirrors can if desired be extended laterally from the positions shown in FIGS. 10 and 11 to intersect the upper input and output beams so all the inputs and outputs are on the same side of the device.

By increasing the number of beam splitters in the splitter stages a device in accordance with the present invention can be made for distributing power from one or many inputs independently between many outputs. Growth rules for both tree and multiple input star-networks of the form shown in FIGS. 1, 2 and 3 are shown in FIG. 6.

Figure 12:
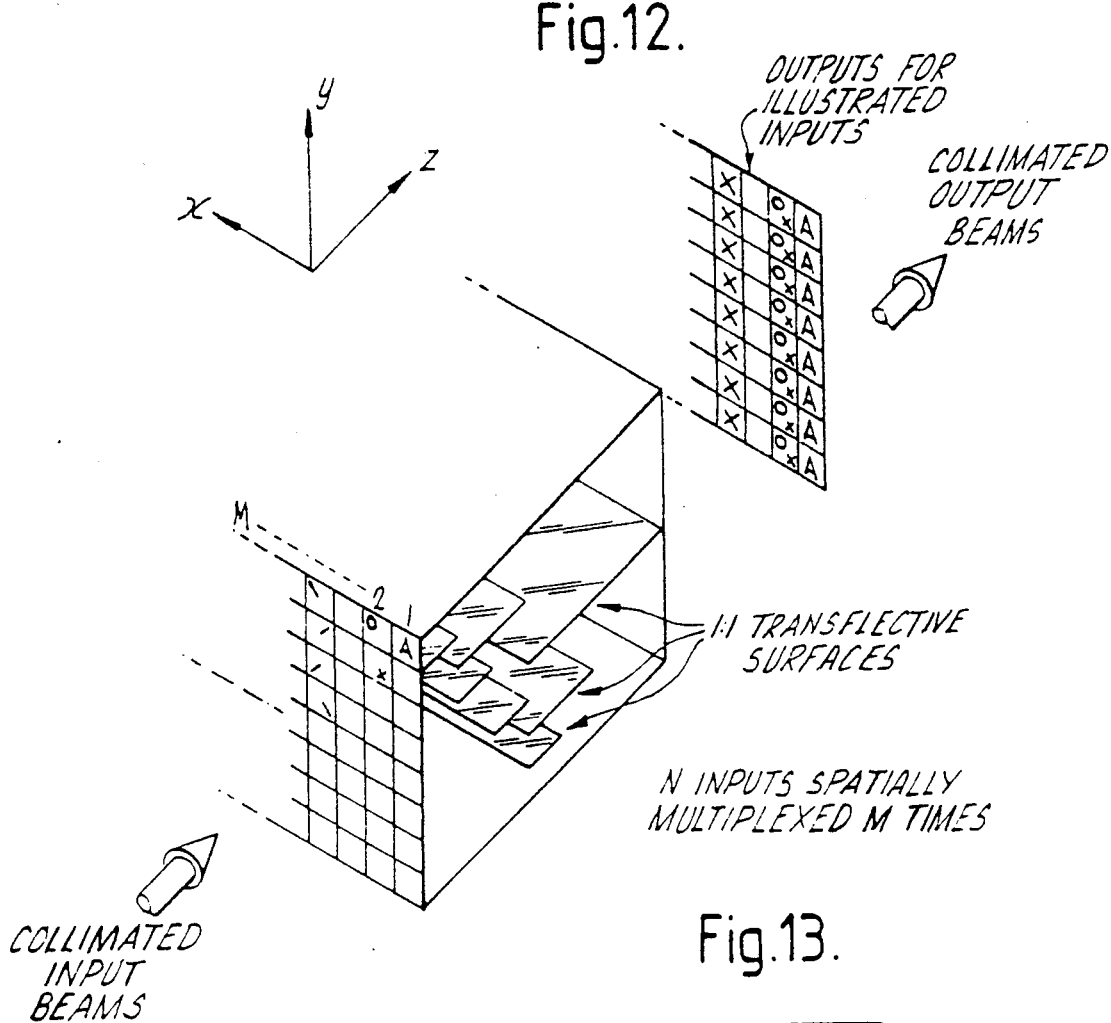
FIG. 12 is a diagrammatic perspective view showing the transmission properties of a device in accordance with the present invention.
Figure 13:
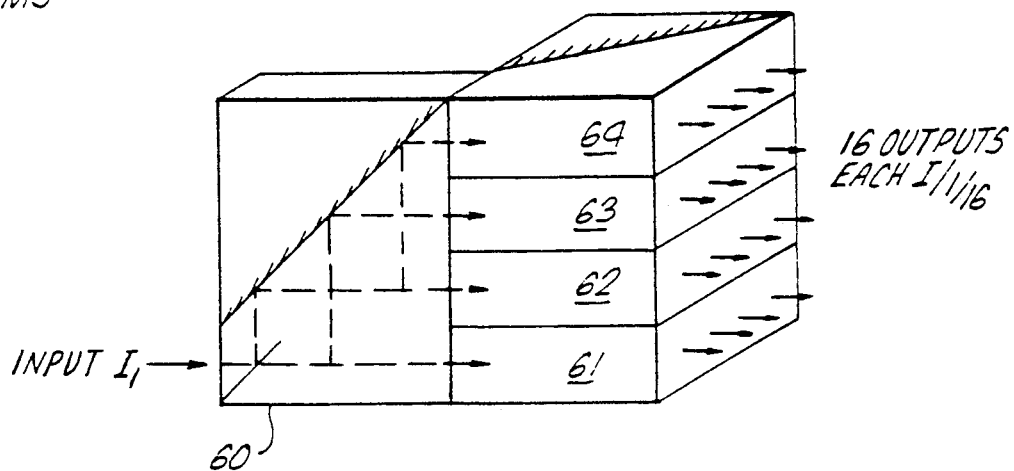
FIG. 13 is a perspective view of a further embodiment of the present invention.
Figure 14:
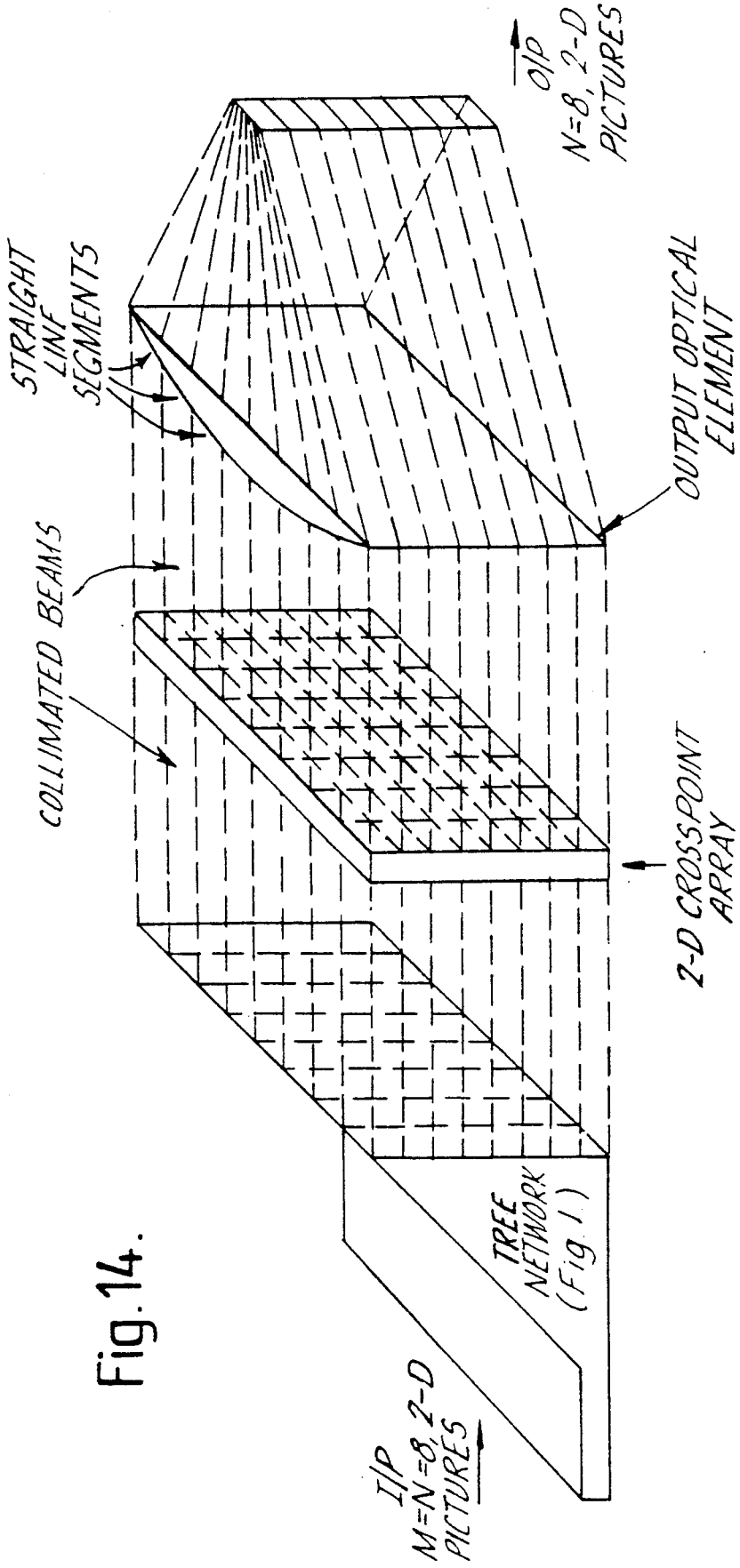
FIG. 14 is a perspective view of an alternative embodiment of a switch incorporating a device in accordance with the present invention.

By extending the transflective surfaces of the above embodiments in the direction orthogonal to the plane of the inputs I1-I8 and outputs O1-O8 the device may be depth-multiplexed with further independent sets of inputs and outputs at intervals along the X-direction as shown in FIG. 12, each independent set of inputs and outputs lying parallel to the Y-Z plane. Such a depth-multiplexed device may be used in combination with a un-multiplexed network of the type described above in order to distribute a single input or inputs over a two-dimensional array. Such an arrangement is as shown schematically for a simple 4-output tree-network in FIG. 13. A depth-multiplexed set of four tree-networks 61-64 is placed at the output of a single tree-network 60. The depth-multiplexed networks are rotated through 90° with respect to the input tree-network and arranged so that each output of the input tree-network 60 goes to the input of a respective one of the networks 61-64 of the depth-multiplexed set. Similarly a depth-multiplexed set of star networks may be arranged to receive the output of a single star network. Alternatively star networks may be combined with tree networks in a similar fashion according to the distribution characteristics required. Devices in accordance with the present invention may advantageously be used in the construction of broadband digital electro-optic space switches. The low-loss and high optical quality of a device in accordance with the present invention allows switch dimensions as high as 300×300 to be achieved. A further advantage of the use of these devices in this context is that the switch throughput can be increased with no loss penalty by using the two spatial dimensions of the signal paths. For example, the signal may consist of a 32-bit data bus or even a complete page of data transmitted in parallel. An architecture for a two-dimensional image switching system is shown in FIG. 14. For simple 1-D serial transmission the output optical elements may be replaced by a simple cylindrical lens. Since inter-crosspoint signals are collimated optical beams, the entire switch traffic can be routed in many ways. It is, for example, possible to switch between M cross point arrays in order to provide a fail-proof backup.

Figure 15:
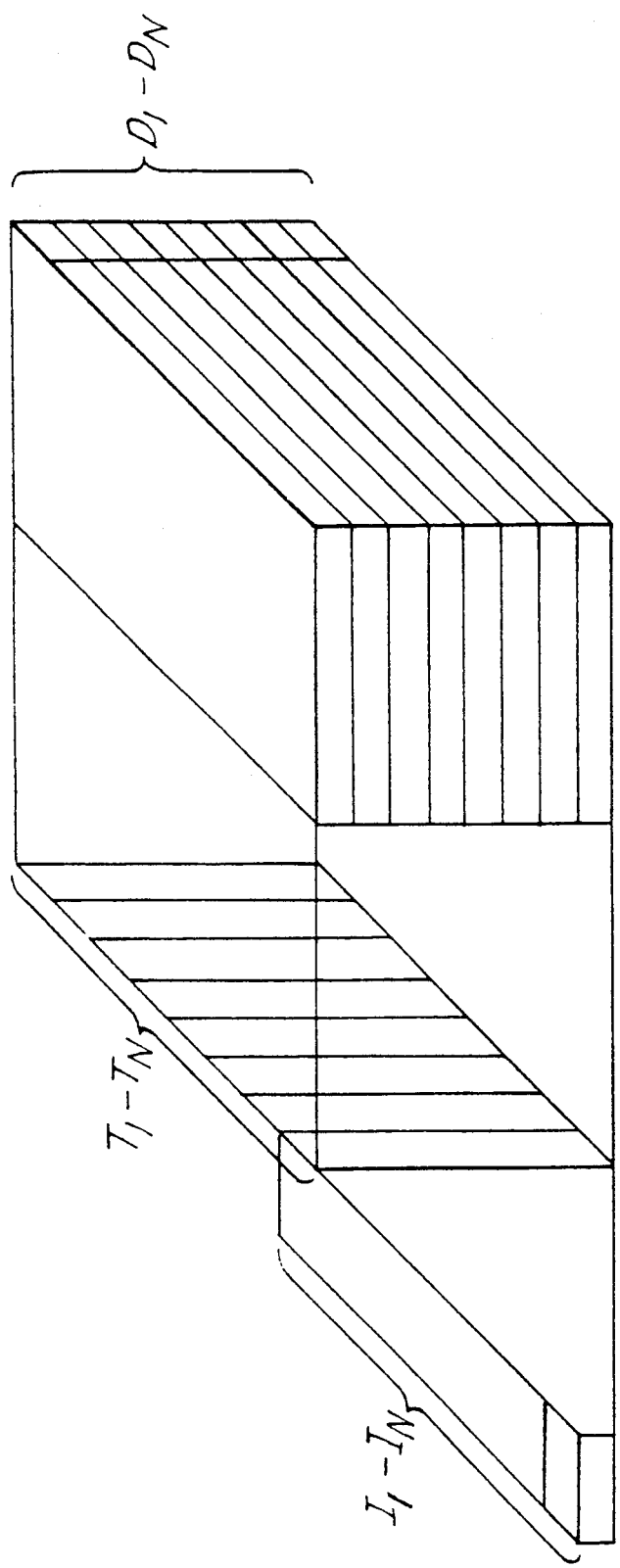
FIG. 15 is a perspective view of an alternative embodiment of a switch including a distributor.

An alternative embodiment of a switch including a distributor in accordance with the present invention, is shown in FIG. 15. The outputs of a depth multiplexed set of N tree networks TI to TN are input to N digitally indexed light deflectors DI to DN spatially multiplexed in the direction at right angles to the depth multiplexed tree-networks. The light deflectors comprise birefingent crystals interspersed with electro-optic polarisers: such deflectors are disclosed in the paper by Kulcke et al on pages 64-67 of the IBM Journal, January 1964. In the optical switch of FIG. 14 the deflectors are used in an N input to 1 output configuration so that the switch as a whole has N outputs extending in a direction at right angles to the N inputs. Such a switch has an inherent loss of $10 \log_{10} N$ dB.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:
1. An optical distributor having:
one optical input device and $2^n$ optical output devices, where n is an integer greater than 1,
said distributor being adapted to split an optical signal received at said input device into $2^n$ optical signals distributed one to each of said optical output devices, whereby said distributor provides one complete optical beam path from said input device to each of said output devices;
wherein said distributor also comprises:
one or more plane mirror surfaces, and two or more transflective surfaces;
said mirror and transflective surfaces being arranged such that:
the intersections of said complete beam paths and said transflective surfaces define $2^n - 1$ transflective means,
each of said transflective means splits an incident beam path into a reflected beam path and a transmitted beam path,
every complete beam path makes exactly n transitions of said transflective means, and
at least one of said transflective surfaces contains at least two of said transflective means.

2. An optical distributor having:
one optical input device and $2^n$ optical output devices where n is an integer greater than 2,
said distributor being adapted to split an optical signal received at said input device into $2^n$ optical signals distributed one to each of said optical output devices, whereby said distributor provides one complete optical beam path from said input device to each of said output devices;
wherein said distributor also comprises:
one or more plane mirror surfaces, and n transflective surfaces;
said mirror and transflective surfaces being arranged such that:
the intersections of said complete beam paths and said transflective surfaces define $2^n - 1$ transflective means,
each of said transflective means splits an incident beam path into a reflected beam path and a transmitted beam path,
every complete beam path makes exactly n transitions of said transflective means, and
one of said transflective surfaces contains $2^{n-1}$ of said transflective means.

3. An optical distributor having:
one optical input device and $2^n$ optical output devices where n is an integer greater than 2,
said distributor being adapted to split an optical signal received at said input device into $2^n$ optical signals distributed one to each of said optical output devices, whereby said distributor provides one complete optical beam path from said input device to each of said output devices;
wherein said distributor also comprises:
one or more plane mirror surfaces, and n transflective surfaces;
said mirror and transflective surfaces being arranged such that:
the intersections of said complete beam paths and said transflective surfaces define $2^n - 1$ transflective means, namely one first transflective surface, one last transflective surface and (n−2) intermediate transflective surfaces, each of said transflective means splits an incident beam path into a reflected beam path and a transmitted beam path, every complete beam path makes exactly n transitions of said transflective means, said first transflective surface contains one transflective means, said last transflective surface contains $(2^{n-1})$ transflective means, each having its reflective beam path and its transmitted beam path connected to different ones of said output devices such that each output device is connected to one of said transflective means, for the or each integral value of m in the range m=1 to m=n−2 inclusive; there is an intermediate transflective surface which contains $2^m$ of the transflective means.

4. An optical distributor according to claim 3, which has one mirror surface, and all of said transflective surfaces are parallel to said mirror surface.

5. An optical distributor according to claim 4, wherein the transmitted beam from each transflective means in said first transflective surface and the or each intermediate transflective surface goes directly to another transflective means and each reflected beam from said transflective means goes to another transflective means by way of reflection from said mirror.

6. An optical distributor according to claim 3, wherein all of said transflective surfaces are coplanar, whereby all of said transflective means are located in a single transflective plane, and each of said transflective surfaces is located between and parallel to two mirror surfaces.

7. An optical distributor having:

$2^n$ optical input devices and $2^n$ optical output devices, where n is an integer greater than 1, said distributor being adapted to split an optical signal received at any one of said input devices into $2^n$ optical signals distributed one to each of said optical output devices, whereby said distributor provides one complete optical beam path from each of said input devices to each of said output devices;

wherein said distributor also comprises:

one or more plane mirror surfaces, and two or more transflective surfaces;

said mirror and transflective surfaces being arranged such that:

the intersections of said complete beam paths and said transflective surfaces define $n2^{n-1}$ transflective means, each of said transflective means has two primary paths and two secondary paths, such that an optical signal received by either one of said primary paths is provided as a reflected signal in one of said secondary paths, and as a transmitted signal in the other of said secondary paths, every complete beam path makes exactly n transitions of said transflective means, and at least one of said transflective surfaces contains at least 2 of said transflective means.

8. An optical distributor having:

$2^n$ optical input devices and $2^n$ optical output devices, where n is integer greater than 1, said distributor being adapted to split an optical signal received at any one of said input devices into $2^n$ optical output devices, whereby said distributor provides one complete optical beam path from each of said input devices to each of said output devices;

wherein said distributor also comprises:

one or more plane mirror surfaces, and two or more transflective surfaces;

said mirror and transflective surfaces being arranged such that:

the intersections of said complete beam paths and said transflective surfaces define $n2^{n-1}$ transflective means, each of said transflective means has two primary paths and two secondary paths, such that an optical signal received by either one of said primary paths is provided as a reflected signal in one of said secondary paths, and as a transmitted signal in the other of said secondary paths, every complete beam path makes exactly n transitions of said transflective means, and at least one of said transflective surfaces contains $2^{n-1}$ of said transflective means.

9. An optical distributor having:

$2^n$ optical input devices and $2^n$ optical output devices where n is an integer greater than 2, said distributor being adapted to split an optical signal received at any one of said input devices into $2^n$ optical signals distributed one to each of said optical output devices, whereby said distributor provides one complete optical beam path from each of said input devices to each of said output devices;

wherein said distributor also comprises:

one or more plane mirror surfaces, and n transflective surfaces;

said mirror and transflective surfaces being arranged such that:

the intersections of said complete beam paths and said transflective surfaces define $n2^{n-1}$ transflective means, each of said transflective means has two primary paths and two secondary paths, such that an optical signal received by either one of said primary paths is provided as a reflected signal in one of said secondary paths, and as a transmitted signal in the other of said secondary paths, every complete beam path makes exactly n transitions of said transflective means, and each of said transflective surfaces contains $2^{n-1}$ of said transflective means.

10. An optical distributor having:

one optical input device, and $2^n$ optical output devices, where n is an integer greater than 2, said distributor being adapted to split an optical signal received at said input device into $2^n$ optical signals and to provide one of said signals to each of said output devices whereby said distributor provides one complete optical path from said input device to each of said optical devices, wherein said distributor also comprises:

one or more plane mirror surfaces, and a sequence of n transflective stages said sequence including one first transflective stage; (n−2) intermediate transflective stages, and, one last transflective stage wherein:

said first transflective stage includes one transflective means whereat the one beam path defined by the input device is split into a reflected beam path and transmitted beam path;

the or each of said intermediate transflective states has a predecessor transflective stage being either the first transflective stage or another of said intermediate transflective stages and a successor transflective stage being either the last transflective stage or another intermediate transflective stage different from said predecessor transflective stage and each of said intermediate transflective stages contains twice as many transflective means as its predecessor transflective stage; and said last transflective stage has the or one of said intermediate transflective stages as its predecessor transflective stage and it includes $2^{n-1}$ transflective means each of which splits an incident beam path into a reflected beam path directed to one of said output devices and a transmitted beam path directed to a different one of said output devices whereby each output device is located on one of said beam paths;

wherein:

each transflective means contained in the or each intermediate transflective stage has an incident beam path directed from a transflective means in the predecessor transflective stage said incident beam path being split into a reflected beam path forming the incident beam path to one of the transflective means in the successors transflective stage and a transmitted beam path forming the incident beam path of a different one of the transflective means in said successor transflective stage, and wherein:

all of the transflective means contained in at least one of said intermediate and last transflective stages are located on a single transflective surface.

11. An optical distributor according to claim 10, which comprises one transflective surface corresponding to each one of said transflective stages wherein each of said transflective surfaces contains the or all of the transflective means in the corresponding transflective stage.

12. An optical distributor according to claim 11, which has one mirror surface, and all of said transflective surfaces are parallel to said mirror surface.

13. An optical distributor according to claim 11, wherein all of said transflective surfaces are coplanar, whereby all of said transflective means are located in a single transflective plane, and each of said transflective surfaces is located between and parallel to two mirror surfaces.

14. An optical distributor having:

$2^n$ optical input devices, and $2^n$ optical output devices, where n is an integer greater than 2, said distributor being adapted to split an optical signal received at any one of said input devices into $2^n$ optical signals and to provide one of said signals to each of said output devices whereby said distributor provides one complete optical path from each said input device to each of said output devices, wherein said distributor also comprises one or more plane mirror surfaces, and a sequence of n transflective stages each of which contains $2^{n-1}$ transflective means and said sequence includes one first transflective stage, (n−2) intermediate transflective stages, and, one last transflective stage;

wherein:

each of said transflective means has two primary paths and two secondary paths, such that an optical signal received by either one of said primary paths is provided as a reflected signal in one of said secondary paths, and as a transmitted signal in the other of said secondary paths, the one beam path defined by each of the input devices is received as one of the primary beam paths of one of the transflective means in said first transflective stage;

the or each of said intermediate transflective stages has a predecessor transflective stage being either the first transflective stage or another of said intermediate transflective stages and a successor transflective stage being either the last transflective stage or another intermediate transflective stage different from said predecessor transflective stage;

said last transflective stage has the or one of said intermediate transflective stages as its predecessor transflective stage and each secondary beam path of each transflective means contained in said last transflective stage is directed to one of said output devices whereby each output device is located on one of said beam secondary paths;

wherein:

each transflective means contained in the or each intermediate transflective stage has its primary beam paths directed from different transflective means in the predecessor transflective stage and its secondary beam paths directed to different transflective means in the successor transflective stage;

and wherein:

all of the transflective means contained in at least one of said first, intermediate and last transflective stages are located on a single transflective surface.

15. An optical distributor according to claim 14, which comprises one transflective surface corresponding to each one of said transflective stages wherein each of said transflective surfaces contains the or all of the transflective means in the corresponding transflective stage.

16. An optical distributor according to claim 15, wherein all of said transflective surfaces and all of said mirror surfaces are parallel.

17. An optical distributor according to claim 11, wherein all of said transflective surfaces are coplanar, whereby all of said transflective means are located in a single transflective plane, and each of said transflective surfaces is located between and parallel to at least two mirror surfaces.

* * * * *